P. J. A. PETERSON.
NUT LOCK AND RAIL JOINT PROTECTOR.
APPLICATION FILED MAY 26, 1919.

1,351,786.

Patented Sept. 7, 1920.

Witnesses
William T. Piper
Paul A. Viernen

Inventor
P. J. A. Peterson
H. J. Sanders
By           Atty.

UNITED STATES PATENT OFFICE.

PETER JOHAN ADOLF PETERSON, OF PINE RIVER, MINNESOTA, ASSIGNOR OF ONE-HALF TO OLAF B. ORRES, OF PINE RIVER, MINNESOTA.

NUT-LOCK AND RAIL-JOINT PROTECTOR.

1,351,786.    Specification of Letters Patent.    Patented Sept. 7, 1920.

Application filed May 26, 1919. Serial No. 299,811.

*To all whom it may concern:*

Be it known that I, PETER JOHAN ADOLF PETERSON, a citizen of the United States, residing at Pine River, in the county of Cass and State of Minnesota, have invented certain new and useful Improvements in Nut-Locks and Rail-Joint Protectors, of which the following is a specification.

This invention relates to improvements in combined nut locks and rail joint protectors and its object is to provide a device that serves effectually to unite the meeting ends of railway rails in such manner as to produce the effect of one continuous rail and so eliminate the jolt and vibration ordinarily caused by the passage of the train wheels over worn rail ends; and to prevent the rail-connecting elements from loosening or becoming defective from wear. A further object is to provide a device of this class that is of few parts and cheap to manufacture.

With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts throughout the several views.

Figure 1:
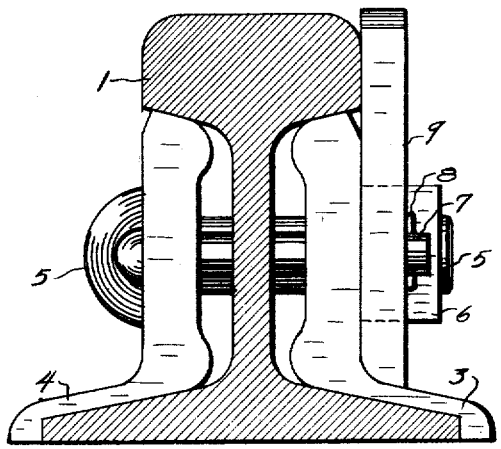
Figure 1 is an end view of Fig. 2.
Figure 2:
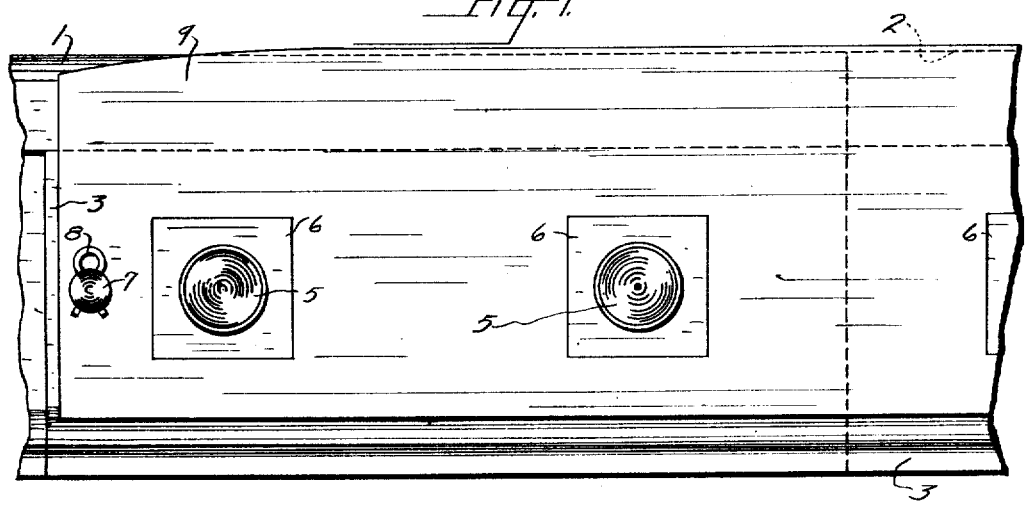
Fig. 2 is a fragmentary view of two railway rails showing the application of my device.
Figure 3:
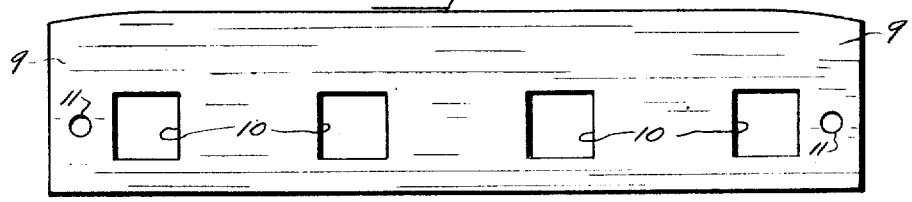
Fig. 3 is a plan view of the cover plate employed.

The reference numerals 1, 2 denote the meeting ends of two railway rails which are provided with the usual fish plates 3, 4 which are secured in position by the usual bolts 5 and nuts 6 and by the small bolts or pins 7 provided with the cotter pins 8. To one of the fish plates 3 I apply a cover plate 9 formed with the large square perforations 10 and with the small circular perforations 11. The bolts and nuts 5, 6 are first placed in operative position to secure the fish plates firmly in position and the cover plate 9 is then applied directly to one fish plate, the perforations 10 being of such size as to snugly receive the nuts 6 which are prevented from turning or working off the bolts by said plate. The cover plate is secured firmly in engagement with the fish plate 3 by means of the pins 7 and cotter pins 8.

The cover plate is of such depth that when it rests upon the inclined base portion of the fish plate it extends to approximately the level of the tread surface of the rails, the top edge of the cover plate being gently curved so that the train wheels will noiselessly engage it without jolt or vibration when passing over the rail ends. It is obvious that the cover plates will positively retain the bolts and nuts 5, 6 in operative position thereby positively retaining the rail ends in operative relation.

What is claimed is:—

In combination with the meeting ends of a pair of railway rails, fish plates, bolts connecting said fish plates to the rails, nuts for said bolts, one cover plate for each pair of fish plates, said cover plate being formed with a plurality of square perforations adapted to snugly receive the said nuts when the cover plate is applied to one of said fish plates and to said bolts, said cover plate, when in position, extending from the base of one fish plate to the level of the tread surface of the railway rails at the rail ends, and fastening means for said cover plate.

In testimony that I claim the foregoing as my own I have hereto affixed my signature in the presence of two subscribing witnesses.

PETER JOHAN ADOLF PETERSON.

Witnesses:
 GILBERT C. RODE,
 O. B. ORRES.